(12) United States Patent
Cooper et al.

(10) Patent No.: US 10,447,676 B2
(45) Date of Patent: Oct. 15, 2019

(54) SECURING APPLICATION PROGRAMMING INTERFACES (APIS) THROUGH INFRASTRUCTURE VIRTUALIZATION

(71) Applicant: ADP, LLC, Roseland, NJ (US)

(72) Inventors: Thomas A. Cooper, Sutton, MA (US); Vincent J. LaRosa, Frenchtown, NJ (US)

(73) Assignee: ADP, LLC, Roseland, NJ (US)

( * ) Notice: Subject to any disclaimer, the term of this patent is extended or adjusted under 35 U.S.C. 154(b) by 430 days.

(21) Appl. No.: 14/512,041

(22) Filed: Oct. 10, 2014

(65) Prior Publication Data

US 2016/0105408 A1  Apr. 14, 2016

(51) Int. Cl.
*H04L 29/06* (2006.01)
*H04L 12/741* (2013.01)
*H04L 12/717* (2013.01)
*H04L 29/08* (2006.01)
*H04L 12/26* (2006.01)
(Continued)

(52) U.S. Cl.
CPC .............. *H04L 63/08* (2013.01); *H04L 45/42* (2013.01); *H04L 45/745* (2013.01); *H04L 63/0428* (2013.01); *H04L 63/0869* (2013.01); *H04L 63/20* (2013.01); *H04L 41/0893* (2013.01); *H04L 43/0817* (2013.01); *H04L 47/125* (2013.01); *H04L 67/02* (2013.01)

(58) Field of Classification Search
CPC ....... H04L 63/08; H04L 45/42; H04L 45/745; H04L 63/0428; H04L 64/0869; H04L 63/20; H04L 41/0893; H04L 43/0817; H04L 47/125; H04L 67/02
See application file for complete search history.

(56) References Cited

U.S. PATENT DOCUMENTS 7,908,462 B2   3/2011   Sung
8,555,275 B1   10/2013  Gokhale et al.
8,640,216 B2   1/2014   Anderson et al.
(Continued)

FOREIGN PATENT DOCUMENTS

TW    201102808     1/2011
WO    WO2013039847  3/2013

OTHER PUBLICATIONS

Duffield et al., Resource management with hoses:point-to-cloud services for virtual private networks, IEEE/ACM Transactions on Networking, 2002 vol. 10, Issue 5, pp. 679-692 (Year: 2002).*
(Continued)

*Primary Examiner* — Luu T Pham
*Assistant Examiner* — Harvey I Cohen
(74) *Attorney, Agent, or Firm* — Andrew M. Calderon; Roberts Mlotkowski Safran Cole & Calderon P.C.

(57) ABSTRACT

Methods and systems for the secure exchange of data within a network are provided. A method includes, registering, by a computer system, one or more stubs installed on at least one computing device. The method further includes constructing a virtual routing table using endpoint address information of the one or more stubs. The method further transmitting a portion of the virtual routing table to the one or more stubs such that the one or more stubs are configured to create a virtual pipe for exchanging data between the at least one computing device and at least one other computing device using the portion of the virtual routing table.

17 Claims, 6 Drawing Sheets

(51) Int. Cl.
*H04L 12/24* (2006.01)
*H04L 12/803* (2013.01)

(56) References Cited

U.S. PATENT DOCUMENTS

| | | | | |
|---|---|---|---|---|
| 8,660,129 | B1* | 2/2014 | Brendel | H04L 12/4641 370/397 |
| 9,009,217 | B1* | 4/2015 | Nagargadde | G06F 17/5009 709/203 |
| 2002/0016926 | A1* | 2/2002 | Nguyen | H04L 29/12018 726/12 |
| 2004/0054807 | A1* | 3/2004 | Harvey | H04L 12/56 709/243 |
| 2004/0260937 | A1* | 12/2004 | Narayanan | H04L 45/04 726/6 |
| 2005/0203673 | A1 | 9/2005 | El-Hajj et al. | |
| 2005/0256732 | A1 | 11/2005 | Bauer et al. | |
| 2008/0086305 | A1 | 4/2008 | Lewis et al. | |
| 2008/0104212 | A1* | 5/2008 | Ebrom | D06F 39/005 709/222 |
| 2008/0301754 | A1 | 12/2008 | Furuichi et al. | |
| 2011/0075674 | A1* | 3/2011 | Li | H04L 45/04 370/401 |
| 2012/0143616 | A1 | 6/2012 | Pulak et al. | |
| 2012/0144250 | A1 | 6/2012 | Lee | |
| 2012/0266231 | A1 | 10/2012 | Spiers et al. | |
| 2013/0066925 | A1 | 3/2013 | Szyperski et al. | |
| 2013/0132854 | A1 | 5/2013 | Raleigh et al. | |
| 2013/0145205 | A1 | 6/2013 | Lee | |
| 2014/0047107 | A1 | 2/2014 | Maturana et al. | |
| 2014/0059647 | A1 | 2/2014 | Immonen et al. | |
| 2014/0108665 | A1 | 4/2014 | Arora et al. | |
| 2014/0244851 | A1* | 8/2014 | Lee | H04L 12/4641 709/228 |

OTHER PUBLICATIONS

Ghobadi-ResourceOptimizationToProvisionVirtualPrivateNetwork UsingHoseModel, IEEE Globecom 2007—IEEE Global Telecommunications Conf, 2007, pp. 2467-2471 (Year: 2007).*
Sadasivarao et al.,Bursting Data between Data Centers: Case for Transport SDN, 2013 IEEE 21st Annual Symposium on High-Performance Interconnects, 2013, pp. 87-90 (Year: 2013).*
Sivaraman et al.,"Virtualizing the Access Network via Open APIs",University of New South Wales Sydney, Australia , Dec. 9-12, 2013, 12 pages.
Author: N/A., "Virtualized API Stacks"Source: http://apievangelist.com/2013/01/28/virtualized-api-stacks/, 4 pages.
Hui et al., "Visual monitoring of network devices based on Google Maps".,vol. 401-403, 3rd International Conference on Frontiers of Manufacturing Science and Measurin, pp. 2013.
Bo et al.,"Grid View: A Dynamic and Visual Grid Monitoring System", Institute of Computing Technology, Chinese academy of Science Beijing 100039., Publication 2004, 4 pages.
Hwang et al.,"A Flexible Failure Handling Framework for the Grid", Information Sciences Institute, University of Southern California,2003 IEEE, 12 pages.
Kolos et al.,"Event Monitoring Design", Monitoring, Event, Sampling, Mar. 24, 2005, 16 pages.

* cited by examiner

SECURING APPLICATION PROGRAMMING INTERFACES (APIS) THROUGH INFRASTRUCTURE VIRTUALIZATION

TECHNICAL FIELD

The invention relates to network security within a data center and, more particularly, to a method and system for the secure exchange of data within a network.

BACKGROUND

Data networks allow for the exchange of data between multiple computing devices. Data exchanged over networks often contain sensitive material which needs to be protected using various forms of network security. For example, data centers, cloud providers, and Infrastructure as a Service (IaaS) providers have the challenge of managing data traffic and keeping client data secure within their infrastructure. Network security typically includes provisions and policies adopted by a network administrator to prevent and monitor unauthorized access, misuse, modification, or denial of the computer network and network-accessible resources. The management of these provisions and policies for networks and challenges presented therefrom are different for all kinds of situations.

Data centers typically include routing and other intermediary components to manage network traffic between systems, including routing, load balancing, and so forth. Enterprise Service Bus (ESB) and service oriented architecture (SOA) frameworks often have similar management structures, at a higher level of abstraction, to manage invocations across the network from an application program interface (API) consumer to an API provider. These frameworks typically use proxies and other centralized components to route and manage traffic, often with storage components and a management console user interface (UI). These frameworks often operate within a company's firewall, and rely on firewalls and network isolation to provide security for unencrypted network traffic.

Such network technology infrastructures suffer from a variety of related issues surrounding web services and the sensitive data that travels between systems on a network. Currently there are unacceptable risks related to the exchange of data over networks due to malware known to exist within firewalled networks having visibility into the paths the sensitive data transits between components within a network.

Current solutions for network security are expensive time consuming to implement, and limit flexibility. For example, web service calls are expensive compared to in-process or cross-thread calls due to network latencies and process synchronizations. For example, adding a proxy in the middle of a network more than doubles the cost of the web service calls. A shared proxy is also a performance bottleneck when multiple calls are routed through it, and creates another source of failure, affecting robustness of the network. Additionally, proxies, routers, load balancers, and other intermediaries require many processes, running on virtual machines and on specialized hardware, many with their own data storage components. The costs, limitations, and management of all this is significant and the auditing and controls enforcement across such a network technology infrastructure is difficult.

SUMMARY OF THE INVENTION

In a first aspect of the invention, a method is provided for managing one or more computing devices. The method includes registering, by a computer system, one or more stubs installed on at least one computing device. The method further includes constructing a virtual routing table using endpoint address information of the one or more stubs. The method further includes transmitting a portion of the virtual routing table to the one or more stubs such that the one or more stubs are configured to create a virtual pipe for exchanging data between the at least one computing device and at least one other computing device using the portion of the virtual routing table.

In another aspect of the invention, a computer program product is provided for creating a virtual pipe for exchanging data that includes computer readable program instructions stored on non-transitory computer readable storage medium. The computer readable program instructions are operable to cause a computing device to initialize a stub at a first computing device. The computer readable program instructions are further operable to cause the computing device to receive at least one endpoint address at the stub from a management console. The computer readable program instructions are further operable to cause the computing device to establish a virtual pipe with a second computing device using the at least one endpoint address. The establishing of the virtual pipe includes creating an authenticated and secured connection between the first computing device and the second computing device. The computer readable program instructions are further operable to cause the computing device to exchange data over the virtual pipe.

In a further aspect of the invention, a computer system is provided for generating a virtual pipe for exchanging data. The computer system includes a hardware memory device that stores program instructions. The computer system further includes a processor that executes the program instructions and causes the computer system to register with a management console. The program instructions are further operable to cause the computer system to receive rules from the management console. The program instructions are further operable to cause the computer system to intercept a web service call from an application. The program instructions are further operable to cause the computer system to determine an endpoint address for the intercepted web service call based on the received rules. The program instructions are further operable to cause the computer system to determine a key corresponding to the endpoint address based on the received rules. The program instructions are further operable to cause the computer system to create a virtual pipe using the endpoint address and the key to exchange data directly with a computing device using the virtual pipe.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF ASPECTS OF THE INVENTION

Figure 1:
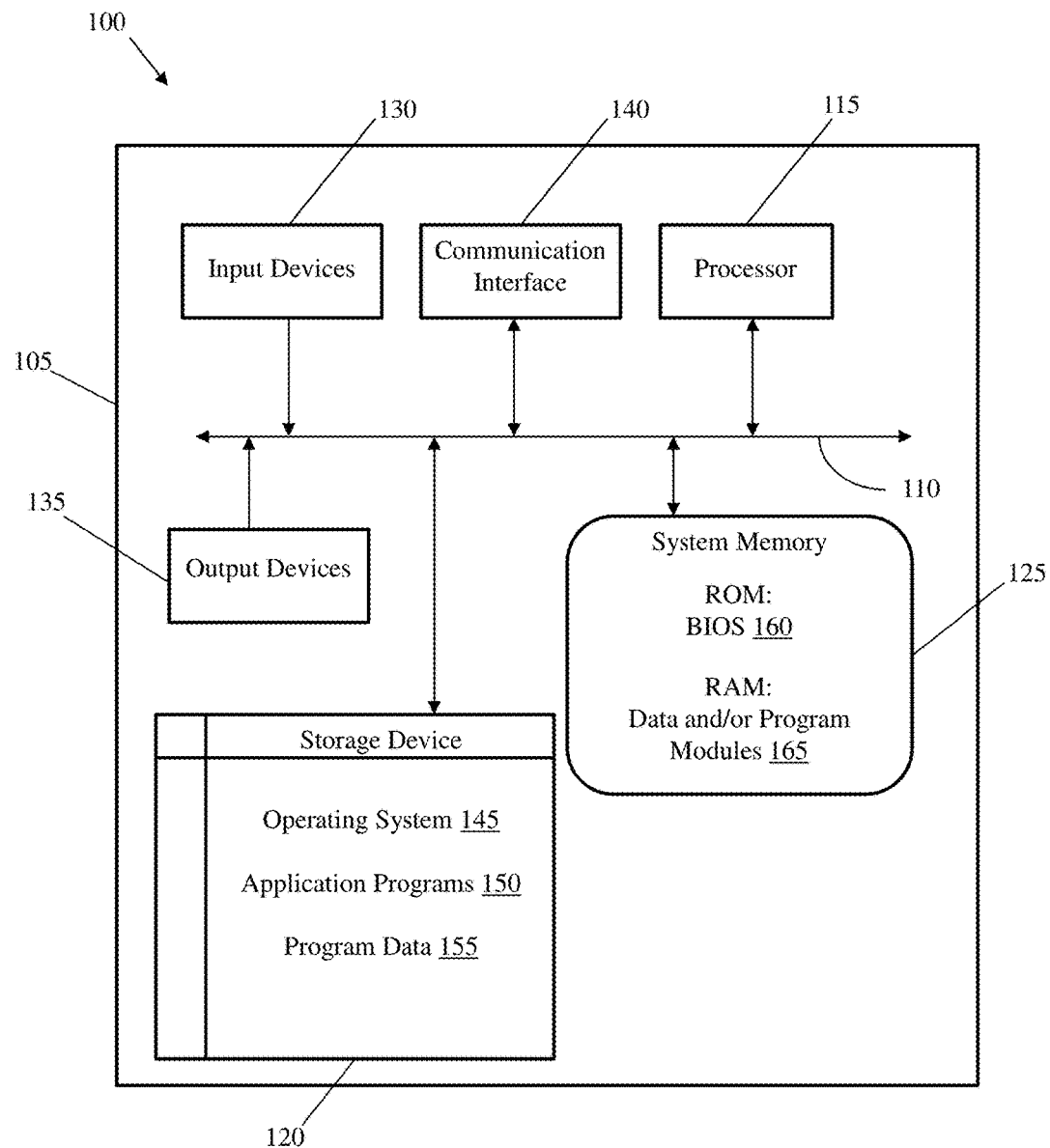
FIG. 1 is an illustrative architecture of a computing system implemented as embodiments of the present invention.

The invention relates to network efficiency and security within a data center and, more particularly, to a method and system for the secure exchange of data within a network. More specifically, implementations of the invention provide methods and systems for building a secure virtualized Application Programming Interface (API) infrastructure within a data center. In embodiments, the secure virtualized API infrastructure may be achieved by the virtualization of security protections and eliminating proxies, routers, and other intermediary components and distributing their respective functions to managed endpoint stubs invoked by each web service-enabled application component. Advantageously, in embodiments, the use of a secure virtualized API infrastructure using stubs secures internal data and APIs, improves efficiency and scalability by eliminating hops and bottlenecks, provides comprehensive and centralized management of live endpoints, and provides automation and simplicity for application components to plug into the grid as a provider or consumer of web services.

In embodiments, stubs may be a combination of generated code and configuration data that handles authentication, authorization, routing, data level controls, and encryption for the exchange of data between computing devices. For example, stubs may be virtual API interfaces programmed and/or configured by a system administrator for each application on a computing device. Accordingly, stubs eliminate the need for intermediary hardware that increases the complexity and limitations of security and network designs requiring hardware to proxy, route or apply security, risk and privacy controls to API calls. By eliminating intermediary hardware, stubs reduce the hop count by reducing the number of hardware based routers or gateways needed to handle the exchange of data between computing devices which will provide increased scalability and flexibility through this virtualized approach.

Advantageously, stubs use their own respective routing information such that computing devices with stubs may be capable of communicating and exchanging data directly with one another by creating a virtual connection (e.g., a virtual pipe) between respective computing devices. For example, the routing information shared with each stub is limited to the endpoint information for each computing device that the particular stub will exchange data with. Advantageously, the use of stubs to create virtual pipes eliminates the need for multiple pieces of dedicated hardware to route connections between computing devices to provide features such as Hypertext Transfer Protocol (HTTP) HTTP Secure (HTTPS) and Extensible Markup Language (XML) firewall, integrated authentication, integrated selective encryption (Transfer, Data Element, or Payload), protocol enforcement, field/data input validation, header injection/control/routing, verb control, session replay attack mitigation, Cross-site Scripting (XSS) prevention, Disk Operating System (DOS) Prevention, Uniform Resource Language (URL) Re-writing, parameter tamper prevention, session hijack prevention, activity auditing, and session tracing.

In embodiments, virtual pipes are used to secure data traffic between applications, ensuring data exchanges are not seen or tampered with, and API calls are authorized. Advantageously, using centrally managed stubs and virtual pipes to virtualize APIs provides significant benefits through an increase in scalability, throughput, flexibility, ease of use, simplicity, security, and programming consistency. In embodiments, virtual pipes provide control over applications themselves by using embedded stubs. In embodiments, virtual pipes provide centralized management of routing, load balancing, security, and control, and virtualize their implementation by dynamically federating those functions into the applications themselves, which reduces hops and eliminates intermediary bottlenecks and associated brittleness. For example, virtual pipes abstract the communication mechanism, simplifying development, and allowing the wire-level API protocol to be independent of the application.

To this end, in embodiments, the use of virtual pipes virtualizes intermediate proxies by distributing the functions of the proxies to endpoint stubs. Advantageously, this allows direct, authenticated, point-to-point, secure web service calls among components, while creating a virtualized "infrastructure fabric" that may be managed centrally through a centrally managed console.

In embodiments, virtual pipes may be established using a set of configurable stub libraries and a management console. For example, the library may include specifications for routines, data structures, object classes, and variables for APIs. A stub library may be invoked by each application endpoint, and establishes secure communication to the centrally managed console for APIs. The centrally managed console dynamically provisions stubs with API specifications, authorizations, routing, keys, etc. The stubs may provide real-time activity monitoring and control with the console. API calls from an application component go through a respective stub for an application, which handles all security functions (e.g., encryption, authorization checks, etc.), determines an endpoint stub to invoke, and then invokes that endpoint stub directly with no need for any intermediary devices. The invoked endpoint stub then (i) receives, (ii) decrypts, (iii) translates to a native internal call, and (iv) returns any result the API requires back securely to the caller.

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors, microprocessors, or specialized dedicated processors that include processing circuitry operative to interpret and execute computer readable program instructions, such as program instructions for controlling the operation and performance of one or more of the various other components of computing device 105 for implementing the functionality steps and/or performance of the present invention. For example, processor 115 interprets and executes the processes, steps, functions, and/or operations of the present invention, which may be operatively implemented by the computer readable program instructions. For example, the processor 115 may be configured to provide the functionality of creating virtual pipes using stubs and managing the stubs using a centrally managed console. In embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention. In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to create virtual pipes using stubs and manage the stubs using a centrally managed console. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
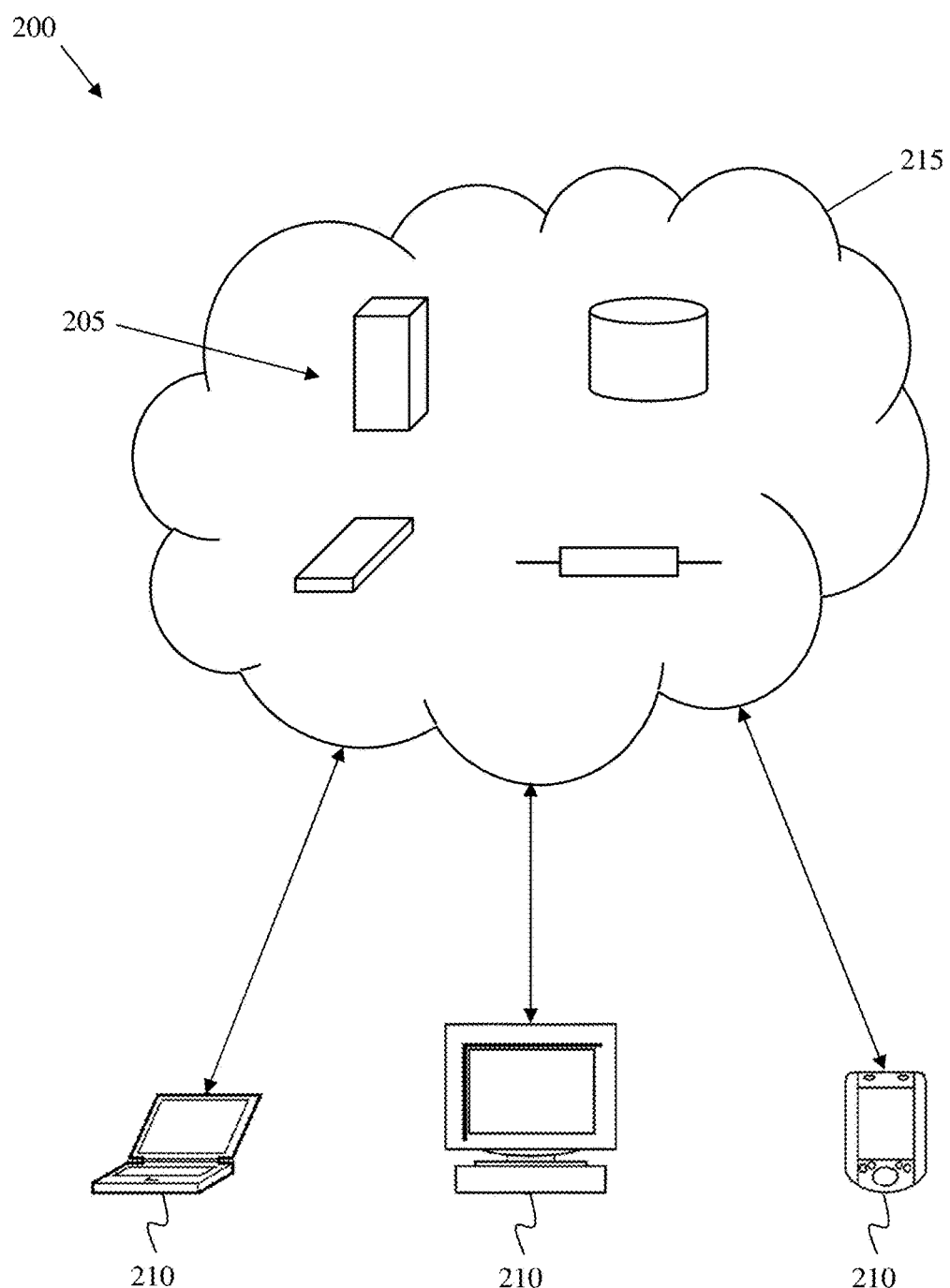
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smart phones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), IaaS, and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level APIs. The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including hardware and software layers, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
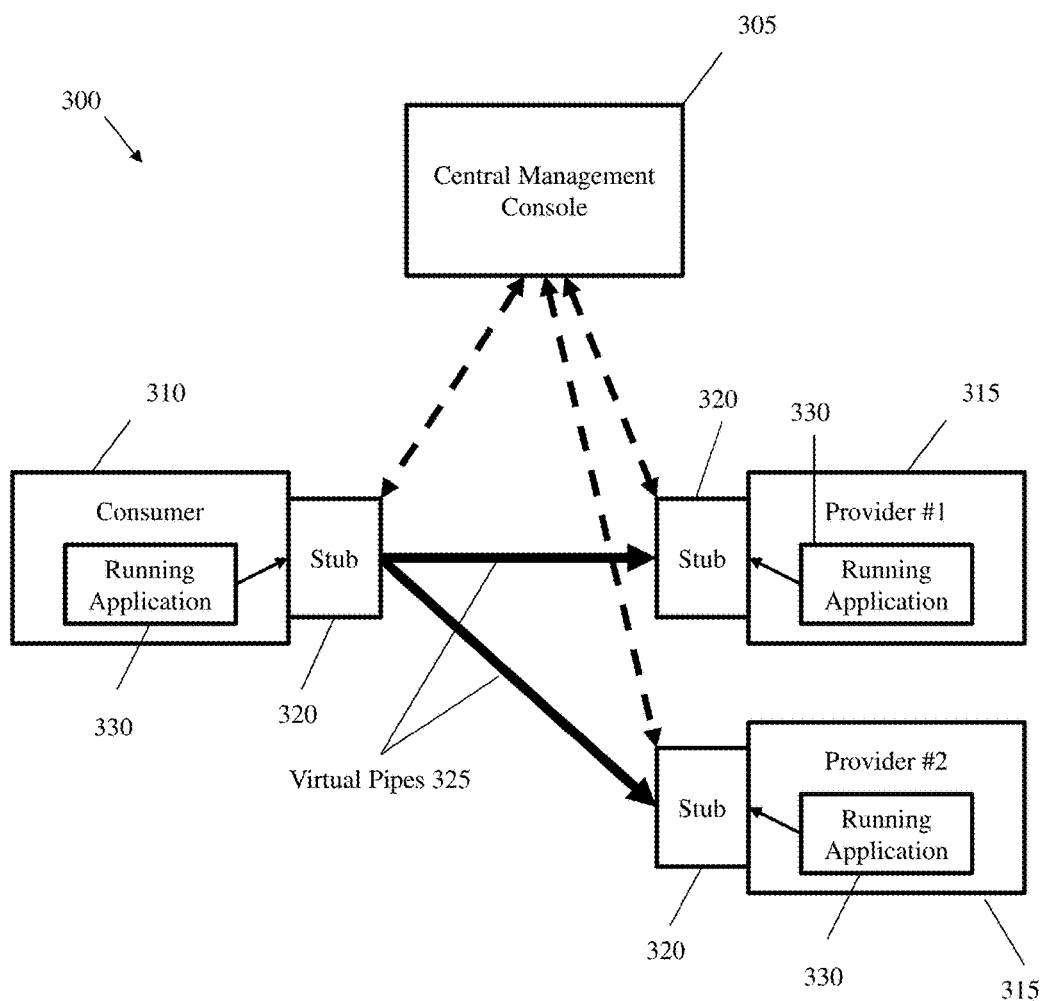
FIG. 3 shows a block diagram in accordance with aspects of the invention.

FIG. 3 shows a block diagram in accordance with aspects of the invention. More specifically, FIG. 3 shows a functional block diagram that illustrates functionality of aspects of the invention. In embodiments, FIG. 3 depicts system 300 comprising central management console 305, consumer computing device 310, provider computing devices 315, stubs 320, and virtual pipes 325. In embodiments, system 300 may also include any devices (not shown) configured to be used in a data center, cloud environment, or other network devices, such as routers, servers, or mobile devices. Central management console 305 may be a computing device (e.g., computing device 105 discussed with respect to FIG. 1) operable to manage and communicate with stubs 320 installed on multiple other computing devices (e.g., consumer computing device 310 and/or provider computing devices 315 such as a computing device 105 as discussed with respect to FIG. 1) over a network. For example, central management console 305 may be a standalone computing device, a collection of computing devices in a single location (e.g., a server rack), or a collection of computing devices in a cloud infrastructure (e.g., cloud computing environment 200 with respect to FIG. 2). In embodiments, central management console 305 includes software and hardware for real time activity monitoring and managing data exchanges between multiple other computing devices through the use of stubs 320. For example, central management console 305 may operate using a server based application configured for system virtualization and/or cloud management.

In embodiments, central management console 305 may be configured to manage secure data exchanges and shared network information utilizing stubs 320 (e.g., virtual API interface) installed on one or more computing devices. For example, central management console 305 may be configured to instruct stubs 320 installed on consumer computing device 310 and/or provider computing devices 315 to perform secure data exchanges by establishing virtual pipes 325. In embodiments, provider computing devices 315 may be configured to provide a service such as to one or more consumer computing device(s) 310; whereas consumer computing device 310 may be configured to consume the service of provider computing devices 315. For example, consumer computing device 310 may request information or request an action to be performed by provider computing devices 315.

In embodiments, stubs 320 may be a predefined combination of generated program code and configurations stored and/or run on various computing devices. For example, stubs 320 may be software libraries or in process agents with security protections abstracted from hardware and embedded in a virtual layer. In embodiments, the libraries may include specifications for routines, data structures, object classes, and variables. In embodiments, stubs 320 may be software defined virtual API interfaces that are designed to ensure safe, consistent, efficient, and fully audited communications between processes for one or more running applications 330 such as an exchange of data. For example, in accordance with aspects of the invention, running applications 330 may be a word processing application, a time management application, a database application, and/or proprietary software. For example, running applications 330 utilize APIs used for sharing content and applications between computing devices. In embodiments, each running application 330 on a particular computing device may have a unique stub responsible for securely exchanging data related to that running application 330. In embodiments, stubs 320 may provide abstraction at a web service call level of running applications 330. For example, stubs 320 may provide a web service abstraction layer based on named components and relative Uniform Resource Identifiers (URI), with API-defined headers and payloads. Advantageously, stubs 320 may convert an API web service call received from running applications 330 into a raw HTTP call with additional information and transmit to a destination based on injected rules, routing information, and load balancing information received from central management console 305.

In embodiments, stubs 320 may elaborate or decorate an API web service call with additional data that is carried through multiple running applications 330 calls. For example, stubs 320 may include information in an API web service call for tracing the API web service call through network fabric. Advantageously, the tracing may be used for auditing or performance monitoring or laying orchestration over running applications 330 without their awareness.

In embodiments, stubs 320 may be customized for a particular running application 330 or may be a generic stub to be used with multiple different running applications 330. For example, multiple running applications 330 may use a shared stub library to handle API web service calls. In embodiments, running applications 330 may have multiple instances of the application running and may have a stub for each instance, such that each instance on a single computing device may be recognized as one logical endpoint by central management console 305. In embodiments, stubs 320 may provide abstracted consistent security across multiple programming languages. For example, stubs 320 may be implemented in different computer languages based on the language used in running applications 330 (e.g., JAVA, C++, etc.). For example, running applications 330 based in JAVA may be provided with a JAVA stubs, such that the stub may be configured to understand the API web service calls from the JAVA running applications 330 and is capable of performing the called functions.

In embodiments, stubs 320 may provide a single level abstraction for establishing secure virtual pipes 325 (e.g., virtual connections such as TCP/IP connections) for the exchange of data directly between computing devices. For example, when running applications 330 on a first computing device initiates a web service call, the web service call may be redirected by stubs 320 on the first computing device, such that those stubs 320 may filter, route, encrypt, and/or monitor the web service call.

In embodiments, stubs 320 may filter, route, encrypt, and/or monitor a web service call from running applications 330 by modifying the URL and headers and encrypting the message according to the rules received from the console, transmitting the message to a destination endpoint, and decrypting the results. In embodiments, stubs 320 may also act as a module for handling Representational State Transfer (REST) calls from other devices, forming HTTP requests, processing, listening for requests, and responding to requests. For example, running applications 330 may make an API web service call and stubs 320 for the particular running applications 330 may handle all the steps prior to transmitting the data, such as encryption, addressing, throttling, and/or metering of the API call. Similarly, if an endpoint computing device (e.g., a computing device receiving the API call) has a stub, then stubs 320 for the endpoint computing device may handle all the steps prior to handing the API web service call off to the appropriate running applications 330. For example, stubs 320 for the endpoint computing device may intercept the API web service call prior to running applications 330 getting control and perform authentication, handshaking, decryption of the received data, and/or allows the API web service call to flow to running applications 330 as normal. For example, stubs 320 may intercept API web service calls between a socket connection and running applications 330.

Continuing with respect to FIG. 3, upon initialization, stubs 320 may notify central management console 305 that the stubs 320 are online and available, and register with central management console 305. In embodiments, stubs 320 may be initially programmed to establish a secure connection with central management console 305, perform authentication, and provide central management console 305 with predetermined information. For example, stubs 320 may provide central management console 305 with identification information (e.g., IP address), location information, security requirements, and auditing information. In embodiments, stubs 320 may distinguish themselves from other instances by providing unique identification. For example, stubs 320 may provide the central management console 305 with code formed from a hardware fingerprint.

In embodiments, using the information received from stubs 320, central management console 305 may create a network map and routing tables necessary for centrally managing routing and load balancing managed over stubs 320. Advantageously, prior to initialization of running applications 330, central management console 305 may configure the routing tables statically at stubs 320, indicating which provider computing device a consumer computing device may call. For example, central management console 305 uses the received information to build routing information for all the active and available computing devices on a network and implements the routing and load balancing information in stubs 320. In embodiments, central management console 305 may maintain a real time self healing network map based on information received from stubs 320 and perform live updates of the network map. For example, central management console 305 may periodically ping stubs 320 or instruct stubs 320 to provide central management console 305 with periodic heartbeat notifications and controlled shut down notifications to track which stubs 320 are online/offline.

In embodiments, central management console 305 may provide stubs 320 with rules defining how to establish virtual pipes 325 to be used to exchange data between one or more running applications 330 on various computing devices. For example, central management console 305 may update stubs' libraries with rules instructing stubs 320 how to handle bootstrap protocols, download configurations, software or network updates, authentication, security policies, and/or routing rules. In embodiments, the rules may contain routing tables, encryption keys, and other information necessary to establish virtual pipes 325. For example, central management console 305 may provide each of the stubs 320 with the endpoint information (e.g., IP addresses) and encryption keys needed to communicate directly with other computing devices, such that intermediary devices (e.g., routers and gateways) are not needed. Advantageously, the central management console 305 provides stubs 320 with IP address and encryptions keys that the computing device is registered to call such that intermediary devices are not needed to route the call.

In embodiments, the rules may be a predefined set of rules or may be customizable by an administrator. For example, an administrator may customize that encryption keys are to be cycled periodically, define how stubs 320 are to format data, type, and/or levels of security functionality. For example, consumer computing devices and provider computing devices may have security functionality implemented to allow for the provisions to perform protocol specific firewalling, integrated authentication, integrated selective encryption (Transfer, Data Element, or Payload), protocol enforcement of communications, field/data input validation, header injection/control/routing, verb control, session replay attack mitigation, XSS prevention, DOS Prevention, URL Re-writing, parameter tamper prevention, session hijack prevention, activity auditing, and session tracing. Advantageously, the security functionalities may bi-directional and enforced by both a consumer computing device and a provider computing device in a virtual space.

In embodiments, central management console 305 may provide real time updates of rules and routing information to stubs 320 by using push notifications or live or hot updates. For example, central management console 305 may provide a live push of updates for stubs 320 to asynchronously receive new features, including but not limited to, bug fixes, policies, and configuration without imposing any downtime to running applications 330.

In embodiments, stubs 320 may actively request rules and routing information from central management console 305 upon initialization and/or periodical intervals. In response to requests from stubs 320, central management console 305 may send stubs 320 all the information needed for that particular stub to establish virtual pipes 325 (e.g., a secure connection) with other devices. Advantageously, stubs 320 may control access and security of API web service calls between computing devices without requiring knowledge about the actual functions of running applications. For example, stubs 320 may use an endpoint address and encryption key received from central management console 305 to create a virtual pipe 330 (e.g., a secure connection such as TCP/IP) with another computing device for securely exchanging data directly with the computing device at the endpoint address.

In embodiments, stubs 320 may only need to know the endpoints for one or more computing devices required by running applications 330, and not the routing information for an entire network. Advantageously, stubs 320 only need the endpoint address and encryption key for any device the running applications 330 are registered to call. For example, central management console 305 computes the routing information (e.g., endpoints) and determines the encryption keys for the respective endpoint that each of the running applications 330 on a consumer computing device is registered to call. Advantageously, stubs 320 may only need to know routing information for its own outbound calls and any information for receiving inbound calls, such as private and public key pairs for authentication.

In embodiments, stubs 320 may provide data to central management console 305 for customized monitoring and control purposes. For example, stubs 320 may provide live performance metrics and traffic information to central management console 305. In embodiments, using the information provided by stubs 320, central management console 305 may modify the rules transmitted to stubs 320 to enable throttling of data, metering of data, pause and/or resume operation. In embodiments, central management console 305 may instruct stubs 320 to add tagging/attributes to enable monitoring flows to create real time visualizations of the network and employ virtualization testing. Advantageously, central management console 305 may receive tagging information regarding communications between computing devices from stubs 320 without stubs 320 adding information to the data payload.

In embodiments, stubs 320 may be responsible for load balancing, authorizations, error orchestration, secured communications, simplified infrastructure, and monitoring and control of running applications 330. For example, stubs 320 may be responsible for managing load balancing of multiple computing devices according to the rules received from central management console 305. In embodiments, during operation, central management console 305 may receive performance metrics (e.g., monitoring information, status updates, and/or running application information) from stubs 320, and may make dynamic adjustments to optimize load balancing in real time based on the performance measurements received from stubs 320. For example, central management console 305 may determine that service provider #1 is processing data at twice the rate of provider #2 and re-allocate the load balancing, via stubs 320, to direct ⅔ of the processing to provider #1.

In embodiments, complex protocols around error handling may be handled by stubs 320 in-process. For example, if running application 330 is found to have a security vulnerability, central management console 305 may instruct stubs 320 to be immediately taken offline and instruct remaining active stubs 320 to re-route data around the affected stubs 320. In embodiments, central management console 305 may subsequently manage stubs 320 based on issues related to individual at risk running applications 330, which may be paused/resumed, throttled, and/or removed. For example, if central management console determines certain stubs 320 and/or running applications 330 are problematic or are potential security threats, then central management console 305 may shut down the appropriate stubs 320 until the issues are resolved. In embodiments, central management console 305 may provide other metrics related to stubs 320 and overall network health. For example, dynamic distributed debugging (DDD) may be used to graph visualization and provide varied monitoring detail, or to provide debugging functions such as setting breakpoints, examining individual messages, and altering messages or individual message handling.

In embodiments, a system administrator may use central management console 305 to control stubs 320. For example, the system administrator may determine that a running application 330 is problematic (e.g., by viewing network health metrics on central management console 305) and use the central management console 305 to shut down any stubs associated with the problematic running application 330.

In embodiments, stubs 320 may be configured to create a virtualization of an application framework by simulating (e.g., mocking) a provider computing device and running applications 330 used by a consumer computing device. For example, in a test mode, stub 320 may be configured to construct a result and return it locally using fake endpoints instead of making an API web service call. Advantageously, this high performance mocking strategy may allow regression testing of a consumer running application 330 in an isolated environment under varying return conditions without requiring a working and configured set of provider computing devices, while enabling concurrent development of consumers and providers. For example, stubs 320 may be in full control of what is sent and received, such that stubs 320 may fake the results based on a predetermined configuration, and the consumer computing device may be unaware.

In further embodiments, stubs 320 may be capable of performing authorizations, routing outgoing calls, cache routing information, calls to fill cache on startup, receiving live/hot updates from central management console 305, logging activities, implementing secure sockets layer (SSL), performing virtualization for testing, and encryption for each respective computing device. For example, stubs 320 may use a mutual SSL for authentication to create virtual pipes 325 with keys received from central management console 305. In embodiments, stubs 320 may be configured to primarily perform encryption and decryption of transmitted data for each respective computing device. For example, data exchanges for running applications 330 may be encoded and decoded at stubs 320, and passed on to running applications 330. In embodiments, stubs 320 may provide various levels of encryption when exchanging data utilizing virtual pipes 325. For example, stubs 320 may establish a virtual pipe using SSL/Transport Layer Security (TLS) for full encryption or may only provide encryption of data payloads to allow for header based routing through non-virtual pipes ecosystems.

Figure 4A:
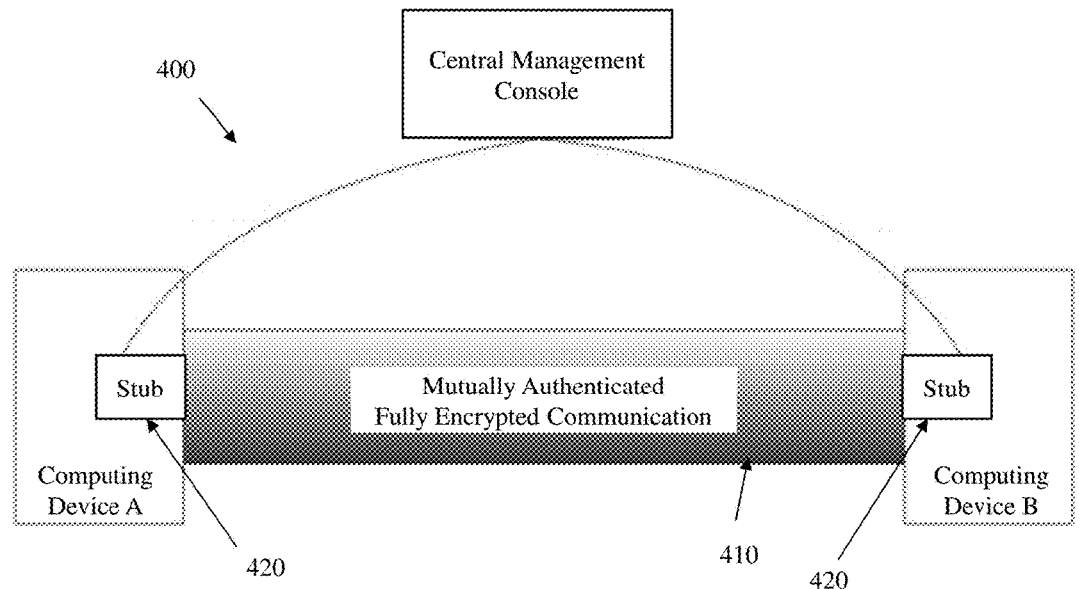
FIGS. 4a and 4b show a high level architectures in accordance with aspects of the invention.

FIG. 4A is a high level architecture for implementing processes in accordance with aspects of the present invention. More specifically, FIG. 4A depicts a data exchange between computing device A and computing device B over a virtual pipe 410 using stubs 420. In embodiments, stubs 420 (e.g., stubs 320 discussed with respect to FIG. 3) may be capable of creating a mutually authenticated fully encrypted communication for the exchange of data when both computing device A and computing device B have stubs 420 installed. For example, stubs 420 may be configured as modules for intercepting REST calls, forming HTTP requests, forwarding HTTP requests to the computing device for processing, listening for a response, returning results to the computing device, and responding. This configuration may result in a mutually authenticated virtual pipe 410 such that all data exchanged is fully encrypted because each stub 420 is able to communicate directly with one another without using intermediary devices.

The configuration in FIG. 4A does not require the use of REST or Simple Object Access Protocol (SOAP) standards, typically used for exchanging data. Instead, stubs 420 may send an optimized high-performance binary data exchange between managed computing device A and managed computing device B. Advantageously, stub to stub data exchanges eliminate the need for multiple pieces of dedicated hardware to route the connections through to provide features such as HTTP/HTTPS and XML firewall, integrated authentication, integrated selective encryption (Transfer, Data Element, or Payload), protocol enforcement, field/data input validation, header injection/control/routing, verb control, session replay attack mitigation, XSS prevention, DOS Prevention, URL Re-writing, parameter tamper prevention, session hijack prevention, activity auditing, and session tracing as these security functions are now virtualized and incorporated into stubs 420.

Figure 4B:
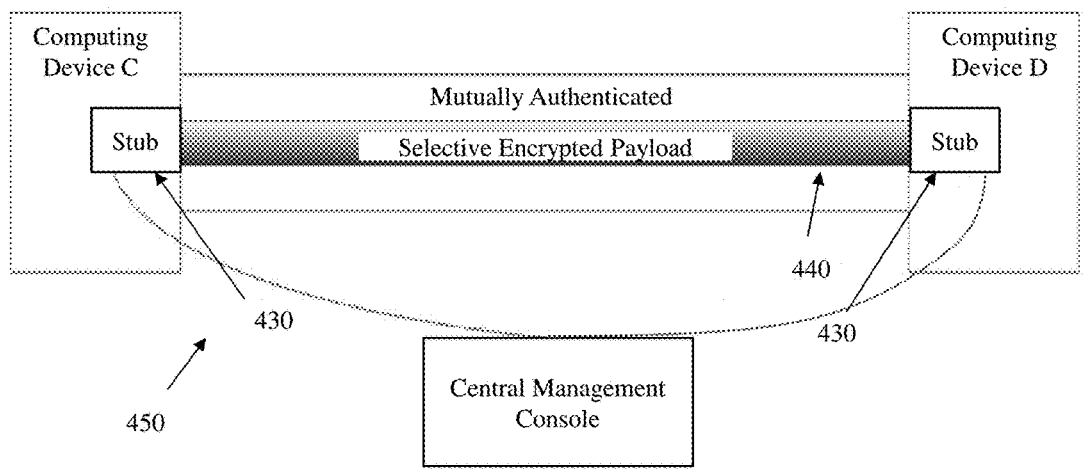

FIG. 4B is a high level architecture for implementing processes in accordance with aspects of the present invention. More specifically, FIG. 4B depicts an infrastructure with a data exchange between computing device C and computing device D using stubs 430 (e.g., stubs 320 discussed with respect to FIG. 3). In embodiments, stubs 430 may be capable of communicating with computing device D using REST and SOAP standard web service calls and using a selective encryption. For example, computing device C may communicate and/or exchange data with computing device D using stub 430 by invoking traditional communication paths known in the art. This configuration may result in a mutually authenticated virtual pipe 440 in which only the payload of the data exchange is encrypted (e.g., selective encryption). For example, stub 430 of computing device C encrypts the data payload as typically done in the art but may not encrypt the headers such that intermediary devices may read the information and route the data payload to the appropriate endpoint.

Alternatively, in embodiments, a computing device with a stub may communicate with a computing device without a stub. For example, when a computing device with a stub communicates with a computing device without a stub there may not be any encryption and the payload may be unaltered. Advantageously, a stub on a consumer computing device may route, load balance, and rewrite URLs. Similarly, a stub on a provider computing device may receive data directly or through traditional routing intermediaries may still perform operations prior to passing off the data to an application.

Figure 5:
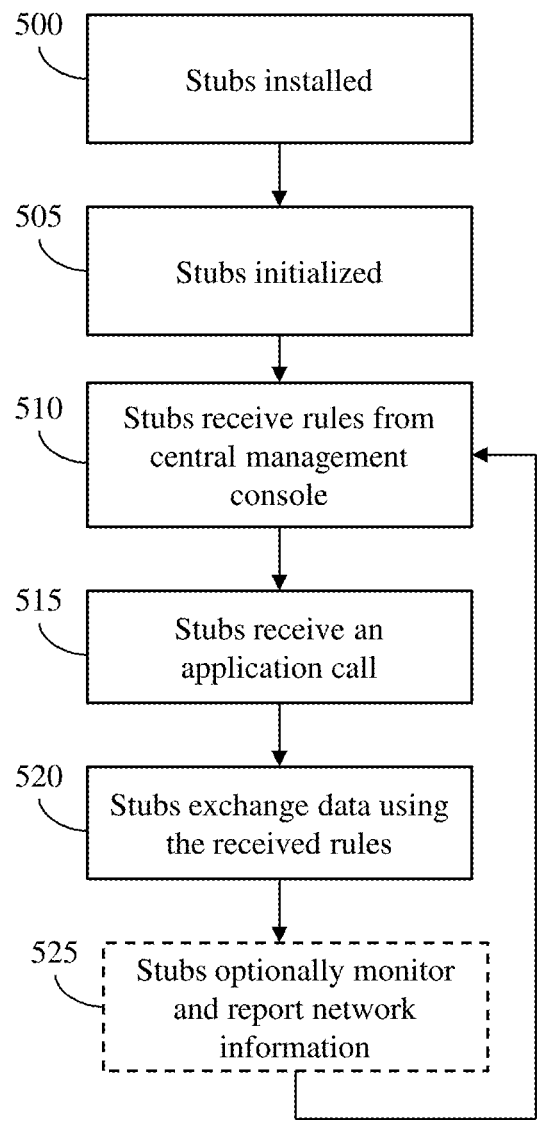
FIGS. 5 and 6 depict exemplary flows for processes in accordance with aspects of the present invention.
Figure 6:
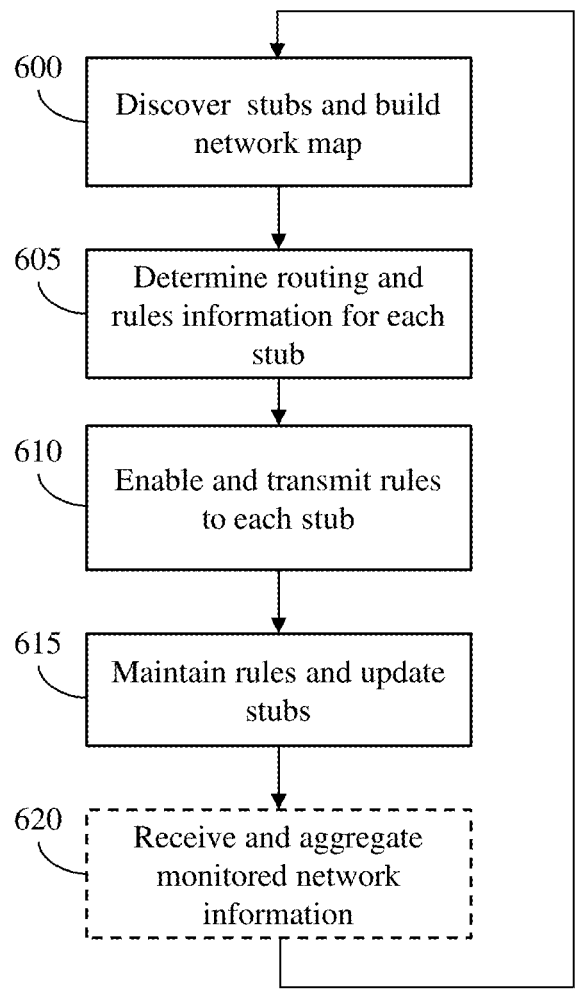

FIGS. 5 and 6 depict exemplary flows for processes in accordance with aspects of the present invention. The exemplary flows can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIGS. 5 and 6 can be downloaded to respective computing/processing devices, e.g., computing system of FIG. 1, as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

FIG. 5 shows the principle operation of stubs (e.g., stubs 320 as they relate to FIG. 3) in accordance with the present invention. At step 500, stubs (e.g., virtual API interfaces) are installed on one or more computing devices (e.g., consumer computing device 310 and provider consumer devices 315) in accordance with the present invention. In embodiments, stubs may be a library built into an applications development stack on the one or more computing devices. For example, a user may install stubs using an installation disk or program or an administrator may install multiple stubs using a batch installation file. In embodiments, stubs may be installed for each running applications on a computing device.

At step 505, after the stubs are installed and the computing devices are online, the stubs may initialize and register with the central management console. For example, during initialization, stubs establish a secure connection with the central management console and send a notification message with additional predetermined information. For example, the stubs may send any information about the stubs and their respective computing devices required by the central management console. In embodiments, an instance of the stubs may be initialized for each instance of an application running on the computing device and all instances of a given application may be viewed as a single logical entity. Advantageously, the stubs may be independently addressable while only requiring the central management console to address single logical entity to implement changes across multiple stubs and/or applications. For example, the central management console will recognize multiple instances of the stubs but may only consider the instances as one logical entity when determining the rules for or configuring an application, an API of that application, an API for a set of applications, or a combination thereof.

At step 510, the stubs receive rules from the central management console. For example, the stubs receive rules for routing outgoing application calls, encryption, authentication, cache routing, activities to log, and any additional rules implemented by the central management console. In embodiments, the stubs may request and receive the rules from the central management console after registration; although such rules may be provided to the stubs by the central management console. For example, the stubs may be provided with information related to configurations for heartbeats, throttling, and/or metering.

Alternatively, in embodiments, the stubs may include rules specific to a consumer or provider computing device. In embodiments, the stubs on a consumer computing device may only receive the rules for routing to particular endpoints n the applications are registered to calls. For example, the stubs on a consumer device may only need to know their own routing information and not the routing information of an entire network. In embodiments, the stubs on a consumer device may also include additional rules. For example, the stubs on a consumer device may include encryption keys for the stubs on destination computing devices, authorization rules, and the stub's own identification, which may be provided in messages to target computing devices. In embodiments, the stubs on a provider device may include information specific to the provider computing devices. For example, the stubs on a provider computing device may include identities and keys for consumer computing devices authorized to invoke the provider computing device's APIs, the provider computing device's own key, and authorization rules. Alternatively, in embodiments, stubs may receive additional endpoints for tasks unrelated to the functions of the applications.

At step 515, the stubs receive a web service call from a running application on the computing device. For example, the stubs may receive a web service call for exchanging data with another computing device.

At step 520, the stubs use the rules received from the central management console to establish a virtual pipe (e.g., a secure connection) with another computing device. For example, a stub on a consumer device may use the routing rules for determining a target computing device in which make a call. The target computing device (e.g., a provider device) may receive the call and uses the rules for authorization and/or decryption prior to passing the call on to an application. In embodiments, the stubs may fully encrypt all the data exchanged over the virtual pipe or may only encrypt the data payload, depending on the rules received from the central management console. For example, stubs might only encrypt the data payload, such that intermediary devices can properly route the data to the appropriate endpoint computing device (e.g., as shown in the environment with respect to FIG. 4B). In embodiments, the stub may also be responsible for load balancing, authorization, and/or monitoring data. For example, the stubs may encrypt and decrypt exchanged data according to the rules received from the central management console.

In embodiments, at optional step 525, the stubs may monitor network traffic and periodically report network data to the central management console. For example, the stubs may send heartbeat notifications with network traffic information. The stubs may continue to receive updates from the central management console and modify the virtual pipes accordingly.

FIG. 6 shows the principle operation of a central management console (e.g., central management console 305 as it relates to FIG. 3). At step 600, the central management receives notifications from stubs on a network indicating that the stubs are online and available. In embodiments, the central management console may ping registered stubs to determine if they are still present and active. Alternatively, in embodiments, the central management console may request performance information from the stubs. For example, the central management console may request the load balancing calculations for each of the stubs. In embodiments, the central management console may register the stubs and request additional information from the stubs. For example, the central management console may request the identification information for computing device the stub is installed on, which application is associated with the stub, what port the stub is using to communicate, and may assign an identification value to the stub.

At step 605, using the received stub information, the central management console may determine the routing information and rules to be applied to each of the stubs. For example, the central management console may provide endpoints and other rules to each stub n such that the stubs may facilitate the functions of each stub's respective API. Advantageously, the central management console sends the stubs rules for data exchanges related to routing, authorization, throttling, metering, encryption/decryption, and/or other configurations. In embodiments, the stubs may receive rules for performing actions prior to handing received calls off to an application (e.g., decryption). Additionally, the central management console may determine which rules may be applicable to each of the stubs.

At step 610, the central management console may send the routing information and provision the rules to the stubs, instructing the stubs how to establish virtual pipes, and exchange data between computing devices. For example, the central management console may send rules pertaining to security, authorization, load balancing, network monitoring, etc.

At step 615, the central management console may provide live updates of routing information and rules to the stubs. For example, the central management console may send push notifications to the stubs when the routing information and/or rules need to be updated.

At step 620, the central management console may request that the stubs monitor network traffic and periodically report network data to the central management console. In embodiments, the central management console may use the monitored information for creating and displaying a live virtualized representation of a network. Additionally, the central management console may use the information for testing purposes. For example, the central management console may search for problematic stubs or may run wiring simulations. The central management console may continue to monitor the network and update the stubs accordingly as changes arise.

In embodiments, the invention provides a computer-implemented method for measurements of performance to be collected and assessed for each API on a network infrastructure, and determinations, assessments, manipulations, and modifications of the various measurements of performance that may be performed and displayed to a user via a GUI. In this case, a computer system, such as computing system 100 (FIG. 1), can be provided on the network infrastructure and one or more systems, such as the central management console 305 (FIG. 3) for performing the processes of the invention can be obtained (e.g., created, purchased, used, modified, etc.) and deployed on the network infrastructure.

In embodiments, the invention provides systems and methods that perform the process of the invention based on a subscription business model. To this end, a service provider, could create, maintain, support, etc., a computer infrastructure, such as computing system 100 (FIG. 1) that is configured to provide a service, for example, collecting and assessing measurements of performance for each API on a network infrastructure, to a consumer. In return, the service provider can receive payment from the consumer(s) under a subscription agreement such as a subscription price paid to have access to the computer infrastructure and/or service.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of managing one or more computing devices, comprising:
registering, by a computer system, one or more stubs installed on at least one computing device, each stub being comprised of a software library with security protections abstracted from hardware;
constructing a virtual routing table using endpoint address information of the one or more stubs;
determining a key corresponding to the endpoint address information;
transmitting a portion of the virtual routing table to the one or more stubs such that the one or more stubs are configured to create a virtual pipe for exchanging data between a first application running on the at least one computing device and a second application running on at least one other computing device using the portion of the virtual routing table and the key, the portion of the virtual routing table being stored in the one or more stubs and including at least endpoint address information of the at least one other computing device, wherein the creating the virtual pipe includes creating an authenticated and secured connection between the first application running on the at least one computing device and the second application running on the at least one other computing device;
virtualizing intermediary devices between the at least one computing device and the at least one other computing device; and
managing the exchanging of the data over the virtual pipe directly between the first application running on the at least one computing device and the second application running on the at least one other computing device without any intermediary devices, using the one or more stubs,
wherein:
the one or more stubs are virtualized application programming interfaces,
the virtualized intermediary devices are included in the one or more stubs, and
the creating the virtual pipe for exchanging the data between the first application running on the at least one computing device and the second application running on the at least one other computing device is performed by the one or more stubs in response to receiving a web service call from the first application running on the at least one computing device.

2. The method of claim 1, wherein the endpoint address information comprises all endpoint addresses necessary to carry out functions of one or more applications installed on the at least one other computing device.

3. The method of claim 1, further comprising determining one or more rules to be applied to the one or more stubs.

4. The method of claim 3, further comprising transmitting the one or more rules to the one or more stubs.

5. The method of claim 4, wherein the one or more rules instruct the one or more stubs to apply a level of encryption for the data.

6. The method of claim 4, wherein the one or more rules instruct the one or more stubs to authenticate the at least one computing device and the at least one other computing device.

7. The method of claim 1, further comprising at least one of: pausing, resuming, or removing execution of the one or more stubs.

8. The method of claim 1, wherein a service provider at least one of creates, maintains, and supports the computer system.

9. The method of claim 1, further comprising deploying a system for creating the virtual pipe, comprising providing a computer infrastructure operable to perform the steps of claim 1.

10. A computer program product for creating a virtual pipe for exchanging data comprising computer readable program instructions stored on non-transitory computer readable storage medium, the computer readable program instructions causing a computing device to:
  initialize and register a stub at a first computing device, the stub being comprised of a software library with security protections embedded in a virtual layer;
  receive, at the stub, a web service call from a first application running on the first computing device;
  receive at least one endpoint address at the stub from a management console;
  determine a key corresponding to the at least one endpoint address:
  in response to receiving the web service call from the first application running on the first computing device, establish a virtual pipe with a second computing device using the at least one endpoint address and the key, the establishing the virtual pipe includes creating an authenticated and secured connection between a first application running on the first computing device and a second application running on the second computing device;
  virtualize intermediary devices between the first computing device and the second computing device;
  manage the exchanging of the data over the virtual pipe directly between the first application running on the first computing device and the second application running on the second computing device without any intermediary devices;
  exchange data over the virtual pipe; and
  monitor and report network health information to the management console,
  wherein:
    the stub is a virtualized application programming interface,
    the virtualized intermediary devices are included in the stub, and
    the monitoring and reporting comprise the computer readable program instructions further causing the computing device to:
      establish a secure connection between the stub and the management console;
      receive one or more rules at the stub from the management console, wherein the one or more rules define the network health information to be monitored by the stub;
      record the network health information at the stub; and
      send the network health information from the stub to the management console.

11. The computer program product of claim 10, wherein the exchanging of the data over the virtual pipe is one of a fully encrypted or selectively encrypted exchange.

12. The computer program product of claim 10, further comprising handling authentication, encryption, and load balancing of the exchanging of the data for the first application.

13. A computer system for generating a virtual pipe for exchanging data, comprising:
  a hardware memory device that stores program instructions;
  a processor that executes the program instructions and causes the computer system to:
    register a plurality of software stubs, each associated with a computer device, with a management console;
    receive rules from the management console for each of the software stubs;
    intercept, using a first software stub of the plurality of software stubs, a web service call from a first application;
    determine an endpoint address for the intercepted web service call based on the received rules, wherein routing information to the endpoint address in the received rules shared by the management console with each software stub is limited to endpoint information that each of the software stubs will exchange data with;
    determine a key corresponding to the endpoint address based on the received rules;
    create a virtual pipe using the endpoint address and the key to exchange data directly with a second application running on a computing device using the virtual pipe, wherein the creating the virtual pipe includes creating an authenticated and secured connection with the second application running on the computing device using the virtual pipe;
    virtualize intermediary devices between the computer system and the computing device; and
    manage the exchanging of the data over the virtual pipe directly between the first application running on the computer system and the second application running on the computing device without any intermediary devices by using the first software stub to encrypt and route the data over the virtual pipe directly to a second software stub of the plurality of software stubs,
  wherein the virtualized intermediary devices are included in the plurality of software stubs.

14. The computer system of claim 13, wherein the web service call is handled by the first software stub.

15. The computer system of claim 14, wherein the program instructions are further operable to cause the computer system to handle authentication and load balancing of the exchanging of the data for the first application making the web service call.

16. The computer system of claim 15, wherein the program instructions are further operable to cause the computer system to monitor and report network health information to the management console, the monitoring and reporting comprising:
  establishing a secure connection between the stub and the management console;
  receiving one or more rules at the software stubs from the management console, wherein the one or more rules define the network health information to be monitored by the software stubs;
  recording the network health information at the software stubs; and
  sending the network health information from the software stubs to the management console.

17. The method of claim 1, wherein the managing the exchanging of the data over the virtual pipe directly between the first application running on the at least one computing device and the second application running on the at least one other computing device without any intermediary devices includes a first stub of the one or more stubs exchanging data directly with a second stub of the one or more stubs.

* * * * *